(No Model.)
F. G. TAYLOR.
SUPPORT FOR BICYCLES.
No. 453,094. Patented May 26, 1891.
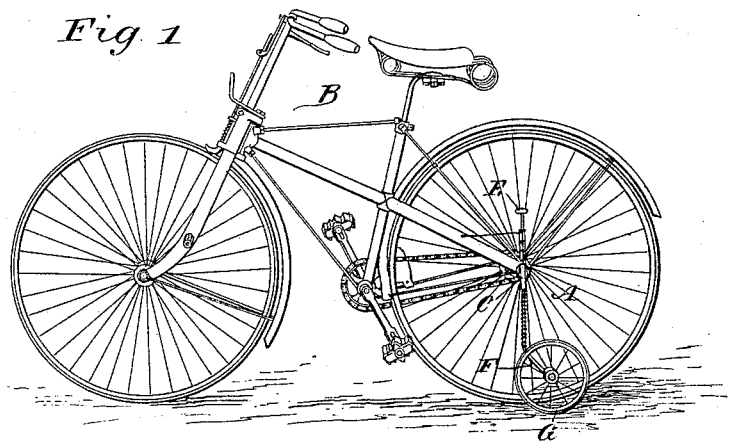
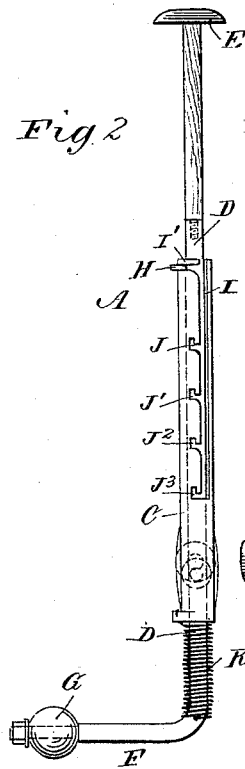
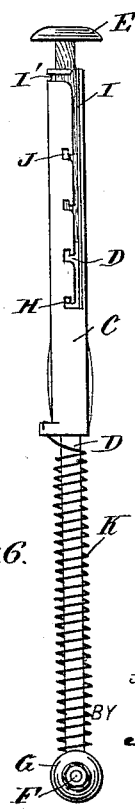
WITNESSES:
Paul Johst
E. M. Clark
INVENTOR:
F. G. Taylor
BY Munn & Co.
ATTORNEYS
THE NORRIS PETERS CO., PHOTO-LITHO., WASHINGTON, D. C.

UNITED STATES PATENT OFFICE.

FREDERICK G. TAYLOR, OF CRANSTON, RHODE ISLAND.

SUPPORT FOR BICYCLES.

SPECIFICATION forming part of Letters Patent No. 453,094, dated May 26, 1891.

Application filed October 6, 1890. Serial No. 367,183. (No model.)

*To all whom it may concern:*

Be it known that I, FREDERICK G. TAYLOR, of Cranston, in the county of Providence and State of Rhode Island, have invented a new and Improved Brace for Bicycles, of which the following is a full, clear, and exact description.

The object of the invention is to provide a new and improved brace or supporting rod which is simple and durable in construction, can be attached to a bicycle on either side or wheel, and is specially designed to prevent the bicycle from falling over when not in use or when the rider desires to rest.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a perspective view of the improvement as applied. Fig. 2 is an enlarged side elevation of the same as it appears when not in use. Fig. 3 is a similar view of the same as in use. Figs. 4 and 5 are perspective views of the sleeve or bearing for the rod, and Fig. 6 shows the device as attached to a bicycle-frame.

The improved brace A can be readily attached to the frame of a bicycle B of any approved construction, either at the front or rear wheel or on the right or left side of the machine. The brace A is provided with a sleeve C, fastened to the bicycle-frame in any suitable manner by suitable means, preferably so that the sleeve stands in a vertical position, as shown in Fig. 1. As shown in Fig. 6, the sleeve is provided with a thread screwing onto the threaded end of the axle in place of the usual nut for holding the wheel on the axle. Separate bolts, as shown in Fig. 4, may, however, be used.

In the sleeve C is fitted to slide a rod D, provided at its upper end with a handle E, arranged within convenient reach of the operator. At the lower end of the rod D is formed a foot F, extending at about right angles to the rod D and carrying at its outer end a ball or wheel G, (see Figs. 1 and 2,) adapted to rest on the ground when the brace is used, as hereinafter more fully described. On the rod D is also secured a pin H, adapted to engage a horizontally-extending notch I', extending from a vertical slot I, formed in the sleeve C. The end of the notch I' preferably extends about one-quarter turn from the slot I. From the latter also extend a series of notches J J' J² J³, &c., one located above the other and in the immediate neighborhood of the slot I.

On the lower end of the sleeve C is secured one end of a spring K, coiled on the lower end of the rod D and secured with its other end at the lower end on the foot or arm F. The spring K may be arranged to press the rod D either downward or upward and also sidewise to retain pin H in slot I or notches J J' J² J³ when engaging either of them.

When the device is applied to the bicycle, as illustrated in Fig. 1, the pin H engages one of the notches J, J', J², or J³, and when the rod D is turned to disengage the pin from the respective slot, then the rod D can be moved upward by hand against the tension of the spring, or is forced upward by the spring if the latter is a pulling-spring. The rod D then moves into the position as shown in Fig. 2, the pin H rests in the end of the notch I', so that the arm F stands in line with the bicycle, and the spring K is compressed or stretched. The foot F, with its ball or wheel G, is then a suitable distance above the ground and entirely out of the way of the operator or obstructions in the path of the bicycle.

When the operator desires to rest with or without dismounting from the bicycle, he turns the handle E, so as to give one-quarter turn to the rod D, thereby moving the pin H out of the notch I' into the slot I. The compressed spring K, if such is used, now forces the rod D downward until the ball or wheel G rests on the ground, thereby forming a brace for the bicycle and supporting the same in a vertical position. In case a pulling-spring is used the operator forces the rod D downward to stretch the spring. In order to lock the rod D in place, the operator permits the spring to turn the handle E slightly, so as to engage the pin H with one of the series of notches J J' J² J³, extending from the slot I.

When the device is not to be used further, the operator first turns the rod D, so as to disengage the pin H from the respective notch J, J', J², or J³, and then pulls the rod D upward against the tension of the spring K, if push-spring is used, so as to compress the latter. The rod D will spring in and engage its pin H with the notch I', and is held there firmly by the spring K. The upper part of the rod D may be made of wood or other suitable material, so as to lighten the attachment as much as possible. The upper end of the sleeve C is preferably provided with a lug connected by a wire or other link with the frame of the bicycle to prevent displacement of the sleeve.

Having thus described my invention, I claim as new and desire to secure by Letters Patent—

1. A bicycle-brace comprising the vertically-slotted tube C, provided with lateral notches I' J J', &c., and a projection or boss on one side having a screw-threaded aperture, the rod D, extending through said tube and having a pin or lug H to work in said slot and notches, a handle on the upper end of the rod, a lateral bend F at its lower end provided with a wheel or roller G, and the spring K, acting torsionally and longitudinally on the rod, substantially as set forth.

2. The combination, with a bicycle having one of the axle-nuts removed, of a brace provided with a rod-carrying tube C, having a lateral offset or lug provided with a screw-threaded aperture receiving the end of the axle in lieu of said removed nut, substantially as set forth.

FREDERICK G. TAYLOR.

Witnesses:
PATK. MULLEN,
DAVID B. TAYLOR.